UNITED STATES PATENT OFFICE.

NORMAN W. STORER, OF PITTSBURG, PENNSYLVANIA, ASSIGNOR TO WESTINGHOUSE ELECTRIC & MANUFACTURING COMPANY, A CORPORATION OF PENNSYLVANIA.

ARMATURE-WINDING FOR DYNAMO-ELECTRIC MACHINES.

975,477.

Specification of Letters Patent. Patented Nov. 15, 1910.

Application filed January 3, 1906. Serial No. 294,429.

*To all whom it may concern:*

Be it known that I, NORMAN W. STORER, a citizen of the United States, and a resident of Pittsburg, in the county of Allegheny and State of Pennsylvania, have invented a new and useful Improvement in Armature-Windings for Dynamo-Electric Machines, of which the following is a specification.

My invention relates to dynamo-electric machines and particularly to machines in which resistance conductors are employed for the purpose of connecting the armature windings to the commutator segments.

The object of my invention is to provide a novel and useful means for increasing, in effect, the thermal capacity of resistance conductors without affecting their resistance functions.

In some dynamo-electric machines, and particularly in alternating current motors of the commutator type, conductors of comparatively high resistance are frequently employed to connect the armature windings to the commutator segments for the purpose of reducing the amounts of current that traverse the local short-circuits which are established in the armature winding when adjacent commutator segments are engaged by the brushes, these conductors being usually located in the bottoms of the core slots, beneath the armature coils, or in separate slots in the armature structure.

The conductors generally consist of thin strips of German silver or other high resistance metal the thermal capacity of which is so small that they become heated to an objectionably high temperature by the currents flowing through them. While the thermal capacity of the resistance conductors cannot be actually increased without decreasing their resistance, the desired result can be secured, without varying the resistance, by my invention, which consists in placing strips of good heat-conducting material in the core slots, in close proximity to, but insulated from, the resistance conductors.

In alternating current railway motors which are subjected to ordinary service conditions, the aforesaid German silver strips are of sufficient size to carry the average electric currents which flow through them when the motors are in operation but are incapable of adequately absorbing or radiating the heat energy imparted to them by currents supplied to the motors when the armatures are at rest, as is the case, for example, when an electric locomotive or other vehicle is started under heavy load or other unfavorable conditions.

Figure 1:
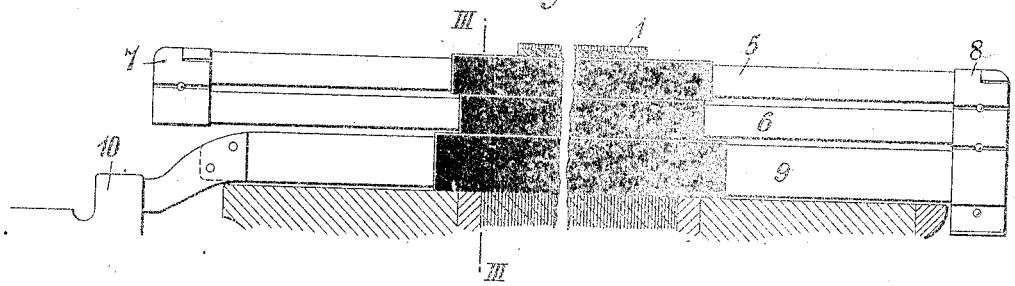
Figure 2:
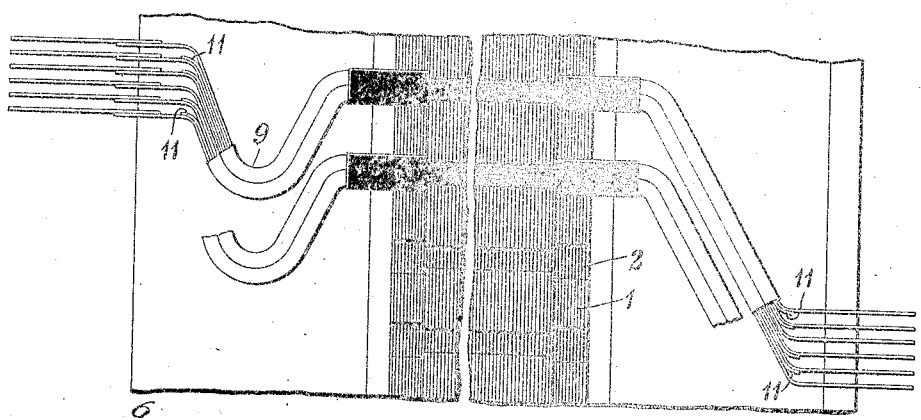
Figure 3:
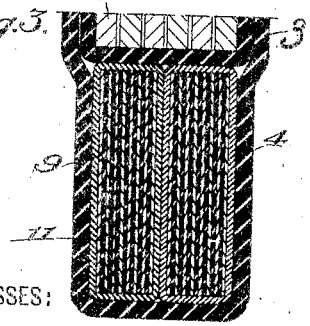

Figure 1 of the accompanying drawing is a view, in section, of a portion of an armature that is constructed in accordance with my invention. Fig. 2 is a plan view of a portion of the armature shown in Fig. 1, the armature coils being removed for the sake of clearness of illustration, and Fig. 3 is a transverse, sectional view on line III—III of Fig. 1.

An armature core 1 having peripheral slots 2, the outer portions 3 of which are wider than the inner portions 4, is provided with a winding comprising a plurality of coils each of which is composed of a plurality of sections 5 and 6 that are located, one above the other, in the upper portions 3 of the core slots and the ends of which are connected by means of clips 7 and 8. The clips 8 serve also to connect the ends of the armature coils to conductors 9 that are composed of German silver or other high resistance material whereby the armature winding is connected to the commutator segments 10. The resistance conductors are formed in thin strips and are insulated from each other and assembled in separately insulated groups, two of which are located in the narrower portion 4 of each of the core slots, the width of each group being such as to permit of application thereof to the armature core, through the narrow openings at the periphery, into the core slots. Located between the resistance conductors of each group and in close proximity thereto but electrically insulated therefrom, are strips 11 of good heat-conducting material, such as copper or other sheet metal, which coöperate with the resistance strips in providing the desired thermal capacity and thus serve to prevent the temperature of the resistance conductors from becoming excessively high, without interfering with their resistance function.

I claim as my invention:

1. The combination with a commutator cylinder, an armature winding comprising a plurality of groups of coils, and resistance conductors for connecting the winding to the commutator cylinder segments, of strips of good heat-conducting material placed between adjacent resistance conductors and electrically insulated therefrom.

2. The combination with a commutator cylinder, a slotted armature core, a winding therefor comprising a plurality of groups of coils located in the outer portions of the core slots, and resistance conductors for connecting the winding to the commutator cylinder segments said resistance conductors being arranged in groups and located in the innermost portions of the core slots, of strips of good heat-conducting material placed between the resistance conductors and electrically insulated therefrom.

3. The combination with a commutator cylinder, an armature winding and conductors for connecting the winding to the commutator cylinder segments, of strips of good heat-conducting material placed adjacent to said conductors and insulated therefrom.

4. The combination with a commutator cylinder, an armature winding and conductors for connecting the winding to the commutator cylinder segments, of strips of sheet metal located adjacent to, but insulated from, said conductors.

5. The combination with a commutator cylinder, a slotted armature core, a winding therefor comprising a plurality of coils located in the outer portions thereof, and conductors located in the inner portions of the core slots and serving to connect the winding to the commutator cylinder, of strips of good heat-conducting material located adjacent to, but insulated from, said conductors.

6. A dynamo-electric machine comprising an armature core provided with slots, coils and high-resistance leads in said slots and heat-conducting strips located in the slots adjacent to the high-resistance leads.

7. A dynamo-electric machine comprising an armature core provided with slots, coils and high-resistance leads in said slots, and heat-conducting elements adjacent to said leads and in non-inductive relation thereto.

8. A dynamo-electric machine having a commutator and an armature provided with high-resistance leads and with heat-conducting elements adjacent to, but insulated from, said leads and in non-inductive relation thereto.

In testimony whereof, I have hereunto subscribed my name this 30th day of December, 1905.

NORMAN W. STORER.

Witnesses:
A. L. RALSTON,
BIRNEY HINES.